(12) United States Patent
Jang et al.

(10) Patent No.: US 11,358,894 B2
(45) Date of Patent: Jun. 14, 2022

(54) MICRO-BUBBLE PUMP APPARATUS FOR WATER TREATMENT

(71) Applicant: KOREA INSTITUTE OF CIVIL ENGINEERING AND BUILDING TECHNOLOGY, Goyang-si (KR)

(72) Inventors: Choon Man Jang, Goyang-si (KR); Sang Moon Lee, Incheon (KR)

(73) Assignee: KOREA INSTITUTE OF CIVIL ENGINEERING AND BUILDING TECHNOLOGY, Goyang-si (KR)

( * ) Notice: Subject to any disclaimer, the term of this patent is extended or adjusted under 35 U.S.C. 154(b) by 0 days.

(21) Appl. No.: 17/271,517

(22) PCT Filed: Dec. 27, 2018

(86) PCT No.: PCT/KR2018/016695
§ 371 (c)(1),
(2) Date: Feb. 25, 2021

(87) PCT Pub. No.: WO2020/116710
PCT Pub. Date: Jun. 11, 2020

(65) Prior Publication Data
US 2021/0253464 A1    Aug. 19, 2021

(30) Foreign Application Priority Data
Dec. 3, 2018   (KR) .................. 10-2018-0153611

(51) Int. Cl.
*C02F 11/04* (2006.01)
*B01F 23/23* (2022.01)
(Continued)

(52) U.S. Cl.
CPC .............. *C02F 11/04* (2013.01); *B01D 53/78* (2013.01); *B01F 23/20* (2022.01);
(Continued)

(58) Field of Classification Search
CPC ................ C02F 11/04; C02F 2303/08; B01F 23/23121; B01F 2101/305; B01F 23/20;
(Continued)

(56) References Cited

U.S. PATENT DOCUMENTS 4,324,657 A * 4/1982 Garrett .................... C02F 3/207
                                                    210/207
2003/0230122 A1* 12/2003 Lee ...................... D06F 35/002
                                                        68/183
(Continued)

FOREIGN PATENT DOCUMENTS

JP        3158760 U        4/2010
KR    10-1999-0045945 A    6/1999
(Continued)

*Primary Examiner* — Fred Prince
(74) *Attorney, Agent, or Firm* — Goldilocks Zone IP Law

(57) ABSTRACT

The present invention relates to a micro-bubble pump apparatus for a water treatment, and the micro-bubble pump apparatus for a water treatment comprises: a motor for generating rotatory power; and a micro-bubble pump connected to the motor and for mixing a feed liquid which flows into one side thereof and a feed gas which is injected into the other side thereof.

4 Claims, 5 Drawing Sheets

(51) Int. Cl.
  *B01F 23/20* (2022.01)
  *B01F 25/60* (2022.01)
  *B01D 53/78* (2006.01)
  *B01D 53/14* (2006.01)
  *B01F 23/231* (2022.01)
  *B01F 101/00* (2022.01)

(52) U.S. Cl.
  CPC ........ *B01F 23/23121* (2022.01); *B01F 25/60* (2022.01); *B01D 53/1462* (2013.01); *B01D 2258/05* (2013.01); *B01F 2101/305* (2022.01); *C02F 2303/08* (2013.01); *Y02E 50/30* (2013.01)

(58) Field of Classification Search
  CPC . B01F 25/60; B01D 2258/05; B01D 53/1462; B01D 53/78; Y02E 50/30
  USPC .................. 210/603; 95/243, 282; 261/84
  See application file for complete search history.

(56) References Cited

U.S. PATENT DOCUMENTS

| | | | |
|---|---|---|---|
| 2007/0039878 A1* | 2/2007 | Roberts | B01F 23/23421 210/605 |
| 2010/0202247 A1 | 8/2010 | Pan | |
| 2011/0156290 A1* | 6/2011 | Wensloff | B01F 27/8111 261/93 |

FOREIGN PATENT DOCUMENTS

| | | |
|---|---|---|
| KR | 10-1027974 B1 | 4/2011 |
| KR | 10-1550254 B1 | 9/2015 |
| KR | 10-2017-0073405 A | 6/2017 |

* cited by examiner

MICRO-BUBBLE PUMP APPARATUS FOR WATER TREATMENT

CROSS REFERENCE TO RELATED PATENT APPLICATIONS

This application claims the benefit under 35 U.S.C. Section 371, of PCT International Application No. PCT/KR2018/016695, filed Dec. 27, 2018, which claimed priority to Korean Patent Application No. KR10-2018-0153611, filed Dec. 3, 2018, the disclosures of which are hereby incorporated by the references.

TECHNICAL FIELD

The present disclosure relates to a micro-bubble pump apparatus for water treatment, and more particularly, to a micro-bubble pump apparatus for water treatment for separating methane gas and impurities included in biogas.

The present disclosure originates from research conducted in the name of "2018 technology upgrade R&D for commercialization promotion" under the support of Commercializations Promotion Agency for R&D Outcomes, the Ministry of Science and ICT [Project serial number: 20180409-001, Project name: Research for performance improvement and commercialization of micro-bubble pumps for water treatment].

BACKGROUND ART

In general, biogas is produced from organic waste having high organic content such as livestock sludge, food waste and sewage in sewage treatment plants. The organic waste is continuously produced through human activities and a variety of industrial activities, and this implies that it is possible to continuously produce biogas.

In this view, there is an increasing interest in the use of biogas, and efforts for extracting biogas produced from organic waste more efficiently are very important in terms of the use of resources. Additionally, in recent situations in which serious energy depletion issues arise, biogas extracted from organic waste presents a new direction for alternative energy.

Meanwhile, biogas includes methane gas ($CH_4$, in an amount of about 60-70%), carbon dioxide ($CO_2$) and hydrogen sulfide ($H_2S$). Except methane gas, the remaining elements included in biogas cause corrosion and reduced efficiency of machine when the biogas is used as a fuel. Accordingly, to extract only methane gas having high purity, technology that separates the remaining elements other than the methane gas and purifies the methane gas is additionally required.

Studies are being made on a variety of biogas purification technologies including chemical adsorption methods, Pressure Swing Adsorption (PSA) methods, water cleaning methods and membrane methods. However, these methods are still insufficient to obtain methane gas of high purity by removing carbon dioxide and hydrogen sulfide. Accordingly, there is a need for technology for efficiently separating methane gas, carbon dioxide and hydrogen sulfide from biogas.

DISCLOSURE

Technical Problem

The present disclosure is directed to providing a micro-bubble pump apparatus for water treatment for removing water-soluble gas such as carbon dioxide and hydrogen sulfide by mixing biogas with feed water by a mechanical operation.

Furthermore, the present disclosure is further directed to providing a micro-bubble pump apparatus for water treatment with maximized water treatment efficiency by changing the structure of an impeller used to mix biogas with feed water.

In addition, the present disclosure is further directed to providing a micro-bubble pump apparatus for water treatment for reducing noise generated during mixing by changing the placement structure of the impeller.

The technical problems of the present disclosure are not limited to the above-mentioned technical problems, and other technical problems not mentioned herein will be clearly understood by those skilled in the art from the following description.

Technical Solution

According to an aspect of the present disclosure for achieving the objects and other features of the present disclosure, there is provided a micro-bubble pump apparatus for water treatment including a motor to generate rotary power, and a micro-bubble pump connected to the motor to mix a feed liquid fed from one side and a feed gas injected from the other side, wherein the micro-bubble pump includes a body having an inlet through which the feed liquid is fed in, an injection port through which the feed gas is injected, an internal space in which the feed liquid and the feed gas are mixed, and an outlet through which mixed micro-bubble type treated water exits, and a rotor positioned in the internal space, and in which an impeller of a single shape with blade tips connected to each other is formed on an outer peripheral surface of a hub, so that the hub rotates by the rotary power.

In the present disclosure, preferably, the feed gas may include biogas.

In the present disclosure, preferably, the single shape with the blade tips connected to each other may have a continuous curved shape in which "S" in cross section with respect to the outer peripheral surface of the hub continuously runs.

In the present disclosure, preferably, the connection surface of the impeller and the hub and the blade tip of the impeller may be formed parallel to each other with respect to a central axis of the hub.

In the present disclosure, preferably, the connection surface of the impeller and the hub and the blade tip of the impeller may be formed cross each other with respect to a central axis of the hub.

In the present disclosure, preferably, the micro-bubble pump apparatus for water treatment may further include a support rib connecting a wall of the impeller to the outer peripheral surface of the hub.

In the present disclosure, preferably, the support rib may extend downward from an inner side of a "U" part in the cross section "S" of the impeller to the outer peripheral surface of the hub.

In the present disclosure, preferably, the outer peripheral surface of the hub may include an arc of an imaginary circle passing through an edge point in contact with the "U" part of the impeller in the outer peripheral surface of the hub and a middle point corresponding to a height 45-65% with respect to the outer peripheral surface in the "U" part of the impeller.

In the present disclosure, preferably, the support rib extends downward from an inner side of a part other than a "U" part in the cross section "S" of the impeller to the connection surface of the impeller facing the inner side of the part.

In the present disclosure, preferably, the impeller may have an unequal interval.

In the present disclosure, preferably, the rotor may be divided into 2n (where n is a natural number of 2 or greater) sectors including a center, the number of blades of the impeller positioned in opposing sectors may be equal, and the number of blades of the impeller positioned in adjacent sectors may be different.

Advantageous Effects

The micro-bubble pump apparatus for water treatment according to the present disclosure has the following effects.

The present disclosure maximizes the amount of dissolution of carbon dioxide and hydrogen sulfide by maximizing the contacting of carbon dioxide and hydrogen sulfide in biogas with feed water.

The present disclosure maximizes the water treatment efficiency by changing the structure of the impeller equipped in the micro-bubble pump apparatus for water treatment, thereby increasing the purity of methane gas extracted in the subsequent step.

The present disclosure may provide a huge selection of materials for manufacturing the impeller by structurally increasing the durability of the impeller.

The present disclosure may minimize noise generated during mixing by changing the location of the impeller.

The effects of the present disclosure are not limited to the above-mentioned effects, and other effects not mentioned herein will be clearly understood by those skilled in the art from the following description.

BEST MODE

Figure 1:
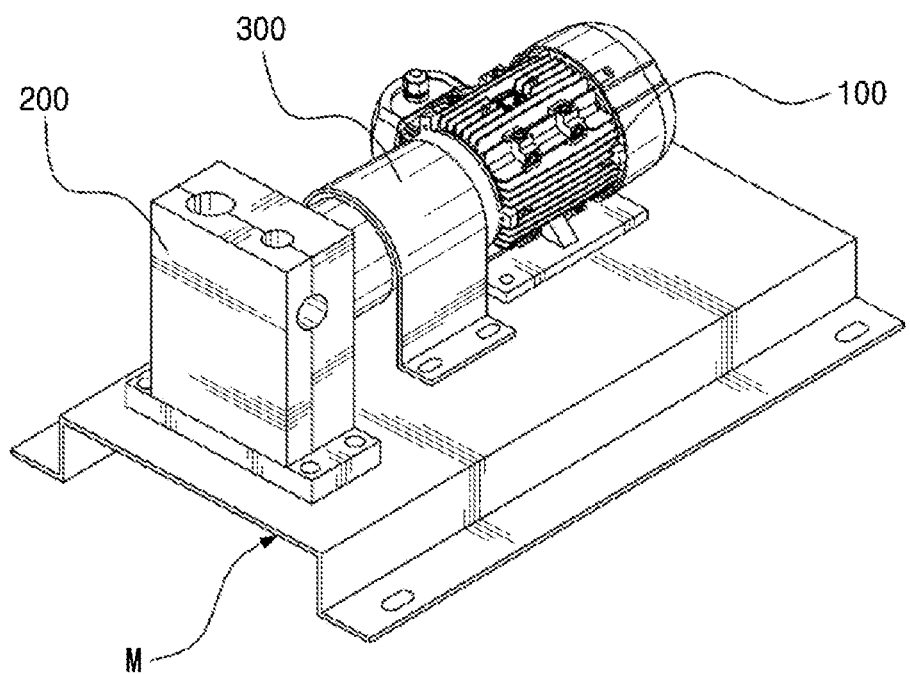
FIG. 1 is a perspective view for describing a micro-bubble pump apparatus for water treatment according to an embodiment of the present disclosure.

A micro-bubble pump apparatus for water treatment includes a motor to generate rotary power, and a micro-bubble pump connected to the motor to mix a feed liquid fed from one side and a feed gas injected from the other side, wherein the micro-bubble pump includes a body having an inlet through which the feed liquid is fed in, an injection port through which the feed gas is injected, an internal space in which the feed liquid and the feed gas are mixed, and an outlet through which mixed micro-bubble type treated water exits, and a rotor positioned in the internal space, and in which an impeller of a single shape with blade tips connected to each other is formed on an outer peripheral surface of a hub, so that the hub rotates by the rotary power.

MODE FOR INVENTION

The description of the present disclosure is merely an embodiment for structural or functional description, and accordingly, it should not be interpreted that the scope of protection of the present disclosure is limited by the embodiments described herein. That is, the embodiments may be variously modified and may have many forms, so it should be understood that the scope of protection of the present disclosure includes equivalents to realize the technical spirit. Additionally, it does not mean that specific embodiment should include all the objects or effects presented by the present disclosure or should include only such effects, and thus it will not be understood that the scope of protection of the present disclosure is not limited thereby.

Meanwhile, the meaning of the terms as used herein should be understood as below.

The terms "first", "second", and the like are used to distinguish one element from another, and the scope of protection should not be limited by the terms. For example, a first element may be referred to as a second element, and likewise, a second element may be referred to as a first element.

When an element is referred to as being "connected to" another element, it should be understood that the element can be directly connected to the other element, but there may be intervening elements. In contrast, when an element is referred to as being "directly connected to" another element, it should be understood that there is no intervening element. Meanwhile, other representations describing a relationship between elements, i.e., "between" and "immediately between" or "adjacent to" or "immediately adjacent to" should be interpreted in the same way.

Unless the context clearly indicates otherwise, it should be understood that the singular forms as used herein include the plural forms as well, and it should be understood that the term "comprises" or "includes" when used in this specification, specifies the presence of stated features, integers, steps, operations, elements, components or groups thereof, and does not preclude the presence or addition of one or more other features, integers, steps, operations, elements, components or groups thereof.

In each step, the symbols (for example, a, b, c) are used for convenience of description, and the symbols are not intended to describe the order of each step, and unless a specific order is explicitly described in the context, each step may take place in a different order from the stated order. That is, each step may take place in the stated order, may be performed substantially at the same time and may be performed in the contrary order.

Unless otherwise defined, all terms used herein have the same meaning as commonly understood by those skilled in the art. The terms, such as those defined in commonly used dictionaries, should be interpreted as having a meaning that is consistent with their meaning in the context of the relevant art document, and it will not be interpreted in an idealized or overly formal sense unless expressly so defined herein.

FIG. 1 is a perspective view for describing a micro-bubble pump apparatus for water treatment according to an embodiment of the present disclosure.

Referring to FIG. 1, the micro-bubble pump apparatus for water treatment includes a motor 100 installed on a support M, a micro-bubble pump 200 connected to the motor 100, and a coupling 300 fixed on the support M around a rotation axis connecting the motor 100 to the micro-bubble pump 200.

The motor 100 is configured to generate rotary power during operation by electricity, and the lower surface of the motor 100 is fixed to the support M by bolting. A rotation axis (not shown) for transmitting the rotary power is coupled to the motor 100, and the rotation axis is connected to the micro-bubble pump 200 to transmit the rotary power generated by the motor 100 to the micro-bubble pump 200.

The micro-bubble pump 200 is configured to generate mixed micro-bubble type treated water by mixing a feed liquid and a feed gas. The micro-bubble pump 200 receives the rotary power generated by the motor 100 from the rotation axis and mixes the feed liquid and the feed gas by the rotation operation.

The micro-bubble pump apparatus for water treatment according to an embodiment of the present disclosure may generate the micro-bubble type treated water by mixing the feed liquid and the feed gas through the mechanical rotary power. The micro-bubble pump apparatus for water treatment may be used in the applications, for example, industrial wastewater treatment as well as over the industrial field related to livestock, sewage and paint using the micro-bubble type treated water. Here, an example is taken in which the use for the purpose of removal of water-soluble gas included in biogas, and accordingly description is made based on an example in which the mixed micro-bubble type treated water is generated using biogas instead of the feed gas and water instead of the feed liquid.

Hereinafter, for convenience of description, the feed gas is defined as biogas and given the reference symbol "A", and the feed liquid is defined as feed water and given the reference symbol "G".

Figure 2:
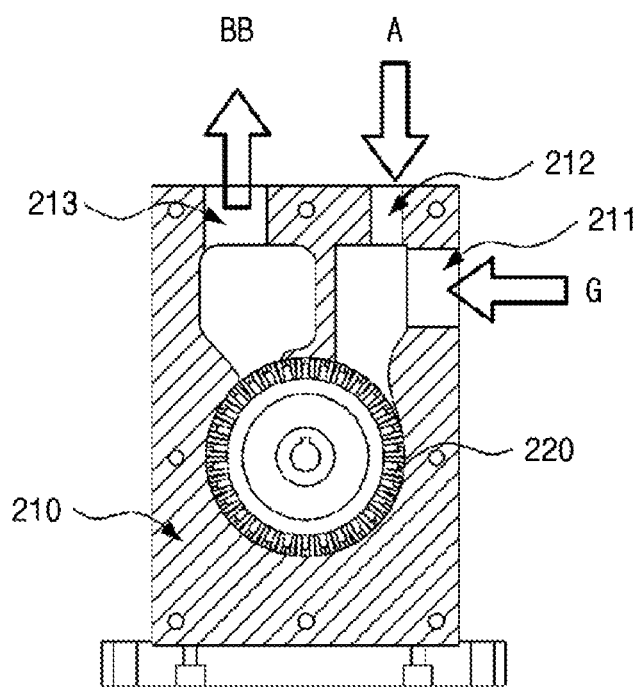
FIG. 2 is a cross-sectional view for describing a micro-bubble pump of FIG. 1.

FIG. 2 is a cross-sectional view for describing the micro-bubble pump 200 of FIG. 1. Referring to FIG. 2, the micro-bubble pump 200 includes a body 210 and a rotor 220. The body 210 has an inlet 211 through which feed water G is fed, an injection port 212 through which biogas A is injected, and an outlet 213 through which mixed micro-bubble type treated water BB exits. The body 210 has an internal space in which the feed water G and the biogas A are mixed. The rotor 220 is positioned in the internal space of the body 210. The rotor 220 has a hub and an impeller provided on the outer peripheral surface of a hub.

The impeller has blade tips connected to each other. The hub would be rotated by the rotary power of the motor 100.

Figure 3:
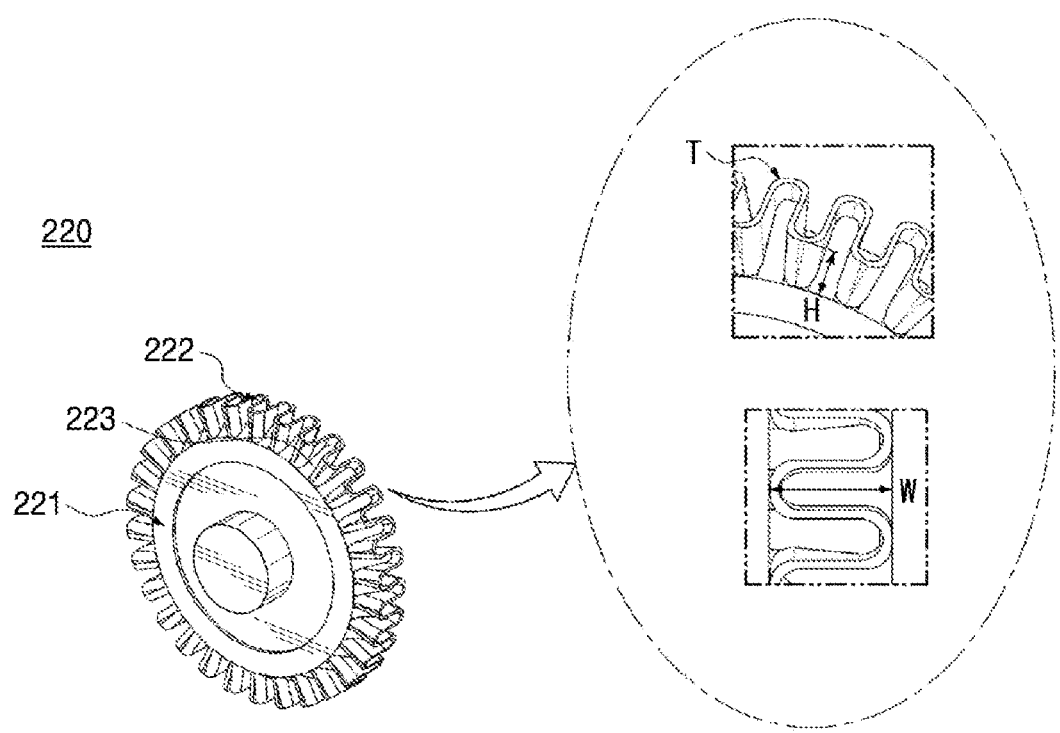
FIG. 3 is a perspective view and a partial enlarged view for describing a rotor of FIG. 2.

FIG. 3 is a perspective view and a partial enlarged view for describing the rotor 220 of FIG. 2.

Referring to FIG. 3, the rotor 220 includes a hub 221 that is connected to the motor 100. The hub would be rotated by the motor 100. The rotor 220 includes an impeller 22 with blade tips connected to each other. The rotor 220 includes a connecting part 223 between the concave inner side of the impeller 222 and the outer peripheral surface of the hub 221.

The hub 221 is a circular member of a preset thickness. The rotation axis of the motor 100 is connected to the center of the hub 221. The impeller 222 as described below is connected to the outer peripheral surface of the hub 221.

The impeller 222 has blade tips T connected to each other. The blade tip T of the impeller 222 has "S" shape cross section with respect to the outer peripheral surface of the hub 221. Therefore, the top surface of the impeller 222 has a continuous curved shape in which alphabet "S" continuously runs. The impeller 222 extends to a predetermined height outward from the outer peripheral surface of the hub 221.

As described above, the feed water G and the biogas A is mixed in the internal space of the micro-bubble pump 200. Such mixing operation of the feed water G and the biogas A is performed by a circulation flow formed by the rotating of the impeller 222. When it is assumed that the mixing pressure necessary for mixing is 3-7 bar, the impeller 222 needs to overcome a friction caused by the mixing pressure and the circulation flow.

Since the impeller 222 according to an embodiment of the present disclosure has blade tips of a continuous curved shape in which alphabet "S" continuously runs, it is possible to overcome the friction caused by the mixing pressure and the circulation flow. It means that even though the impeller 222 is not made of a high strength material, the mixing operation is sufficiently possible, and this indicates that it is possible to provide a huge selection of materials for manufacturing the impeller 222, and further, to reduce the production cost by using a material of low price.

The bottom surface of the impeller 222 connects with the hub 221. The bottom surface of the impeller 222 according to the embodiment of FIG. 3 is parallel to the top surface of the impeller 222 with respect to the central axis of the hub 221. However, the bottom surface of the impeller 222 may not be parallel to the top surface of the impeller 222.

In particular, when the bottom surface of the impeller 222 may not be parallel to the top surface of the impeller 222, it is possible to remove a turbulence by minimizing the separation phenomenon that occurs around the impeller 222, and through this, it is possible to further increase the operation efficiency of the mixing operation.

Referring back to FIG. 3, the rotor 220 includes the connecting part 223 between the concave inner side of the impeller 222 and the outer peripheral surface of the hub 221.

The connecting part 223 is configured to fix the impeller 222 to the hub 221 to improve the durability against an external force. The connecting part 223 extends downward from the inner side of the "U" part in the shape of alphabet "S" of the impeller 222 to the outer peripheral surface of the hub 221.

Figure 4:
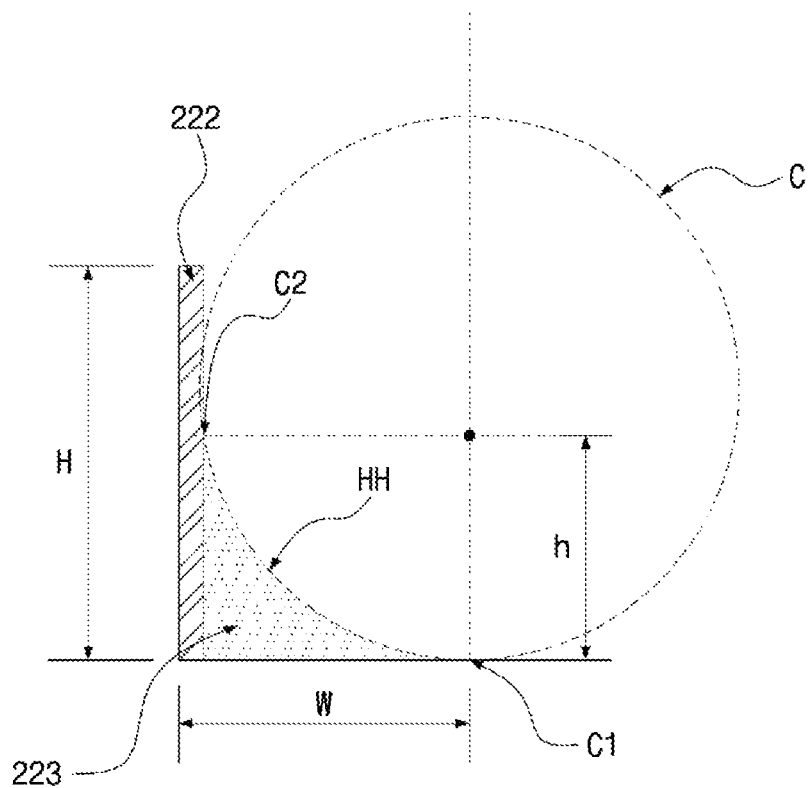
FIG. 4 is a cross-sectional view for describing a support rib of FIG. 3.

FIG. 4 is a cross-sectional view for describing the connecting part 223 of FIG. 3.

As can be seen from FIG. 4, the connecting part rib 223 extends from the inner side of the "U" part in the shape of alphabet "S" of the impeller 222 to the outer peripheral surface of the hub 221. The connecting part 223 has a concave surface from the inner side of the impeller 222 to the outer peripheral surface of the hub 221. The curvature of the concave surface of the connecting part 223 may be defined as an imaginary circle C as shown in FIG. 4.

The imaginary circle C refers to a circle that passes through the outer peripheral width an edge point C1 in the outer peripheral surface of the hub 221 and a middle point C2 in the inner side of the impeller 222. The middle point C2 refers to the point where the surface of the connecting part 223 meets the inner side of the impeller 222. The height "h" of the middle point C2 from the outer peripheral surface of the hub 221 would be 50-60% of the total height "H" of the impeller 222 in FIG. 4. The edge point C1 refers to the point where the surface of the connecting part 223 meets the outer peripheral surface of the hub 221.

Accordingly, the imaginary circle C is a circle that passes through the edge point C1 and the middle point C2. The surface of the connecting part 223 has a shape of a curvature corresponding to an arc HH including the edge point C1 and the middle point C2 in the imaginary circle C.

The following [Table 1] shows the optimized dimensions of the connecting part 223 according to an embodiment of the present disclosure.

TABLE 1

| Design variable | Number of blades (ea) | Blade thickness (mm) | Height (h) of C2 to height of (H) of hub (h/H, %) |
|---|---|---|---|
| Optimal value | 62 | 0.74 | 55 |

As can be seen from [Table 1], the experiment reveals that in the rotor 220 according to an embodiment of the present disclosure, when the radius of the hub 221 is 29.5 mm, it is optimal that the number of the blade tips of the impeller 222 is 62, the thickness of the blade tip in the impeller 222 is 0.74 mm, and the height h of the middle point C2 of the support rib 223 to the height H of the hub 221 is 55%. Additionally, the following [Table 2] shows the experimental data of the pump efficiency of the other impeller, and the impeller 222 structure according to an embodiment of the present disclosure.

TABLE 2

|  | Pressure (kPa) | Torque (J) | Efficiency (%) |
|---|---|---|---|
| Other impeller | 200 | 1.4 | 32.0 |
| Impeller of the present disclosure | 298 | 1.9 | 35.8 |

As can be seen from [Table 2], when the impeller 222 according to an embodiment of the present disclosure is applied, compared to the other impeller, the internal pressure of the micro-bubble pump 200 increases by 150% and the torque increases by 36%, and the experiment reveals that the total pump efficiency rises from 32% to 35.8% by 3.8%.

Subsequently, the micro-bubble pump apparatus for water treatment according to an embodiment of the present disclosure may reduce noise by changing the placement structure of the impeller 222, and it will be described with reference to FIG. 5 below.

Figure 5:
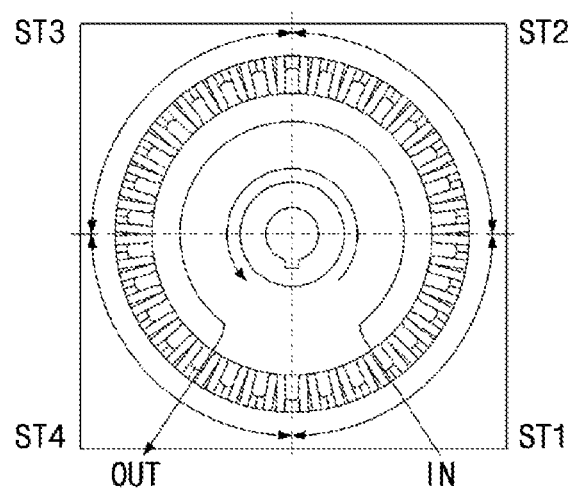
FIG. 5 is a plane view for describing the placement structure of an impeller of FIG. 1.

FIG. 5 is a plane view for describing the placement structure of the impeller 222 of FIG. 1. For convenience of description, an example is taken in which the rotor 220 including the hub 221 and the impeller 222 is divided into four sectors on the plane.

Referring to FIG. 5, the rotor 220 according to an embodiment of the present disclosure is divided into first to fourth sectors ST1, ST2, ST3, ST4. Here, the first sector ST1 is a sector including an inlet IN through which the feed water W and the biogas A are fed in. The second sector ST2 and the third sector ST3 are sectors located sequentially in a direction in which the rotor 220 rotates. The fourth sector ST4 is a sector including an outlet OUT through which the treated water BB exits.

Although an embodiment of the present disclosure divides into a total of four sectors, the number of sectors may be extended to six and eight. That is, the number of possible sectors may be defined as 2"n" (where "n" is a natural number of 2 or greater).

For example, when it is assumed that the number of blade tips of the impeller 222 is 62 in total, each of the first sector ST1 and the third sector ST3 corresponding to the opposing sectors may include 14 blade tips of the impeller 222, and each of the second sector ST2 and the fourth sector ST4 corresponding to the opposing sectors may include 17 blade tips of the impeller 222. That is, the impeller 222 has an unequal interval by placing the blade tips of the impeller 222 in an equal number at the opposing sectors and the blade tips of the impeller 222 in different numbers at the adjacent sectors.

The unequal structure of the rotor 220 may distribute resonance, thereby reducing noise.

The micro-bubble pump apparatus for water treatment according to an embodiment of the present disclosure may divide the rotor 220 into a predetermined number of sectors and include the impeller 222 of an unequal interval, thereby reducing noise.

The embodiments described herein and the accompanying drawings exemplarily describe some of the technical spirit included in the present disclosure. Accordingly, the embodiments disclosed herein are provided to describe the technical spirit of the present disclosure, but not intended to be limiting, and thus it is obvious that these embodiments do not limit the scope of the technical spirit of the present disclosure. It will be interpreted that the scope of protection of the present disclosure covers variations and specific embodiments that can be easily inferred by those skilled in the art within the scope of the technical spirit included in the specification and drawings of the present disclosure.

INDUSTRIAL APPLICABILITY

The present disclosure relates to a micro-bubble pump apparatus for water treatment, and more particularly, to a micro-bubble pump apparatus for water treatment for separating methane gas and impurities included in biogas.

The invention claimed is:

1. A micro-bubble pump apparatus for water treatment, comprising: a motor to generate rotary power; and
a micro-bubble pump connected to the motor to mix a feed liquid fed from one side and a feed gas injected from another side,
wherein the micro-bubble pump includes:
a body having an inlet through which the feed liquid is fed in, an injection port through which the feed gas is injected, an internal space in which the feed liquid and the feed gas are mixed, and an outlet through which mixed micro-bubble type treated water exits; and
a rotor positioned in the internal space, and in which an impeller with blade tips connected to each other is formed on an outer peripheral surface of a hub, so that the hub rotates by the rotary power, and
wherein the impeller has a continuous curved shape in which "S" in a cross section with respect to the outer peripheral surface of the hub continuously runs;
wherein the rotor has a connecting part between an inner side of the impeller and the outer peripheral surface of the hub; and
wherein the surface of the connecting part extends downward from an inner side of a "U" part in the "S" shape of the impeller to the outer peripheral surface of the hub.

2. The micro-bubble pump apparatus for water treatment according to claim 1, wherein the feed gas includes biogas.

3. A micro-bubble pump apparatus for water treatment, comprising: a motor to generate rotary power; and
a micro-bubble pump connected to the motor to mix a feed liquid fed from oneside and a feed gas injected from the other side,
wherein the micro-bubble pump includes:
a body having an inlet through which the feed liquid is fed in, an injection port through which the feed gas is injected, an internal space in which the feed liquid and the feed gas are mixed, and an outlet through which mixed micro-bubble type treated water exits; and
a rotor positioned in the internal space, and in which an impeller with blade tips connected to each other is formed on an outer peripheral surface of a hub, so that the hub rotates by the rotary power, wherein the blade tips of the impeller have an unequal interval.

4. The micro-bubble pump apparatus for water treatment according to claim 3, wherein the rotor is divided into 2"n" sectors including a center, the number of blade tips of the impeller positioned in opposing sectors is equal, and the number of blade tips of the impeller positioned in adjacent sectors is different.

* * * * *